United States Patent

[11] 3,618,035

[72] Inventor Robert L. Simms, Jr.
Colts Neck, N.J.
[21] Appl. No. 817,035
[22] Filed Apr. 17, 1969
[45] Patented Nov. 2, 1971
[73] Assignee Bell Telephone Laboratories, Incorporated
Murray Hill, Berkeley Heights, N.J.

[54] VIDEO-TELEPHONE COMPUTER GRAPHICS SYSTEM
11 Claims, 2 Drawing Figs.

[52] U.S. Cl. .......... 340/172.5, 178/6.8
[51] Int. Cl. .......... G06f 3/14, G06f 3/16
[50] Field of Search .......... 340/172.5; 178/6, 6.8; 235/157

[56] References Cited
UNITED STATES PATENTS

| | | | |
|---|---|---|---|
| 3,242,470 | 3/1966 | Hagelbarger et al. | 340/172.5 |
| 3,263,027 | 7/1966 | Beltrami | 178/6.8 |
| 3,378,820 | 4/1968 | Smith | 340/172.5 |
| 3,389,404 | 6/1968 | Koster | 340/172.5 |
| 3,394,366 | 7/1968 | Dye | 340/172.5 |
| 3,399,401 | 8/1968 | Ellis et al. | 340/172.5 |
| 3,419,674 | 12/1968 | Burns et al. | 178/6 |
| 3,453,384 | 7/1969 | Burns et al. | 178/6.8 |
| 3,457,371 | 7/1969 | Sharon | 179/2 |

*Primary Examiner*—Paul J. Henon
*Assistant Examiner*—Mark Edward Nusbaum
*Attorneys*—R. J. Guenther and Kenneth B. Hamlin

ABSTRACT: A system and method of employing a video-telephone station in conjunction with a remote time-shared computer for graphic display purposes including a fiber optic strand connecting a light pen to the video-telephone camera. The video-telephone camera is connected to the computer via a data translator and synchronizing circuit. The data translator translates video signals received from the station into digital signals for application to the computer, and also translates digital signals received from the computer into video signals for transmission to the station. The synchronizing circuit monitors the scanning phase of video signals received from the station and synchronizes therewith the video signals which are transmitted to the station.

INVENTOR
R. L. SIMMS, JR.
BY R.C. Lipton
ATTORNEY

VIDEO-TELEPHONE COMPUTER GRAPHICS SYSTEM

BACKGROUND OF THE INVENTION

1. Field of the Invention

This invention relates to computer graphics systems and, more particularly, to a method and arrangement of utilizing a video-telephone in a computer graphics mode.

2. Description of the Prior Art

The increased use of computers for scientific, business, educational, manufacturing, and other purposes is well known. This increased use has been accompanied by the development of easier ways for man to communicate with the computers. One such development, generally called "computer graphics," enables man to communicate with computers directly via pictures or graphs.

Computer graphics systems usually include some kind of display device, such as a cathode ray tube; input apparatus, such as a keyboard signal generating device and a light pen; and a computer connected to the display device and input apparatus. Graphs, drawings, etc. are generated by the computer for display on the display device. The system user may identify objects in the display by pointing at them with the light pen and then signaling the computer via the input apparatus to take certain action with respect to the objects identified.

Because communication with the computer in computer graphic systems is primarily in pictorial terms, people without computer training can easily learn to use the computers in their everyday work. Computer graphics facilities, however, are costly and unless the user had occasion to use the system frequently, the cost would simply be too great. It would therefore be desirable if an inexpensive computer graphics capability could be provided to the average user.

Summary of the Invention

It is an object of the present invention to provide an inexpensive computer graphics system.

It is another object of the present invention to provide an arrangement wherein standard video-telephone stations can be utilized as input/output devices in a computer graphics system, as well as for customer-to-customer video communication.

It is a further object of the present invention to provide a computer graphics system utilizing video-telephone stations in which the video-telephone sets need no modification.

These and other objects of the present invention are illustrated in a specific embodiment which comprises a video-telephone station, a data storage and computing machine, and a data translation circuit interconnecting the video station with the data storage and computing machine. The video-telephone station includes a light pen and a fiber optic strand connecting the light pen to the video-telephone camera. The data storage and computing machine is arranged to generate displays for transmission via the data translation circuitry to the video-telephone station. The user indicates what action is to be taken with regard to the displayed information by pointing his light pen to a particular part of the display. In conjunction with pointing his light pen, the user may also key an appropriate code on the telephone "dialing" apparatus. The light pen signal and the keyed information are then transmitted to the data translation circuitry which translates the light pen signal and keyed information into digital signals. The light pen signal identifies the part of the display to which the user is pointing. The digital signals are applied to the data storage and computing machine which processes the signals and generates a response thereto. This response which is in the form of digital output signals is applied to the translation circuitry where it is translated into video signals and transmitted to the video station.

Because the data storage and computing machine may be remote from the video-telephone station, it is necessary that the scanning phase of any video signal received by the station be synchronized with the scanning phase of video signals transmitted from the station (i.e. specifically from the light pen and video-telephone camera) in order to operate in the computer graphics mode. If the computing machine and video telephone station were in close proximity, there would be no need for synchronization since, when the computing machine received a light pen signal, it would "know" that that portion of the video display just transmitted to the station was the portion to which the user was pointing. However, when the computing machine is located remotely from the video station, there is a transmission delay and thus that portion of the video display transmitted to the station just prior to receipt of a light pen signal would not necessarily be the part to which the user was pointing (because of the time elapsed in transmitting the video signal to the station and getting a response back). By synchronizing the scanning phase of video signals transmitted to and received from the station, the computing machine "knows," from the position of a light pen impulse in a video signal received from the station, that the light pen is being pointed to a corresponding position on the display.

In order to synchronize the signals, the computing machine causes the generation of a "dot" of light at a prespecified position on the display screen of the station. The user then places the light pen over the "dot" causing the generation and transmission by the station of video signal representations of the light impulse (i.e. the "dot") detected by the light pen. The data translation and synchronizing circuitry receives these video signals, compares the position of the "dot" in signals received from the station with the position of the "dot" in the video signals transmitted to the station and then shifts the phase of the signals being transmitted to the station until the positions of the "dots" in the two signal trains coincide. In this manner, the scanning phase of signals transmitted to the station are synchronized with the scanning phase of signals received from the station.

BRIEF DESCRIPTION OF THE DRAWINGS

A complete understanding of the present invention and of the above and other objects and advantages thereof may be gained from a consideration of the following detailed description presented in connection with the accompanying drawings which are described as follows.

DETAILED DESCRIPTION

Figure 1:
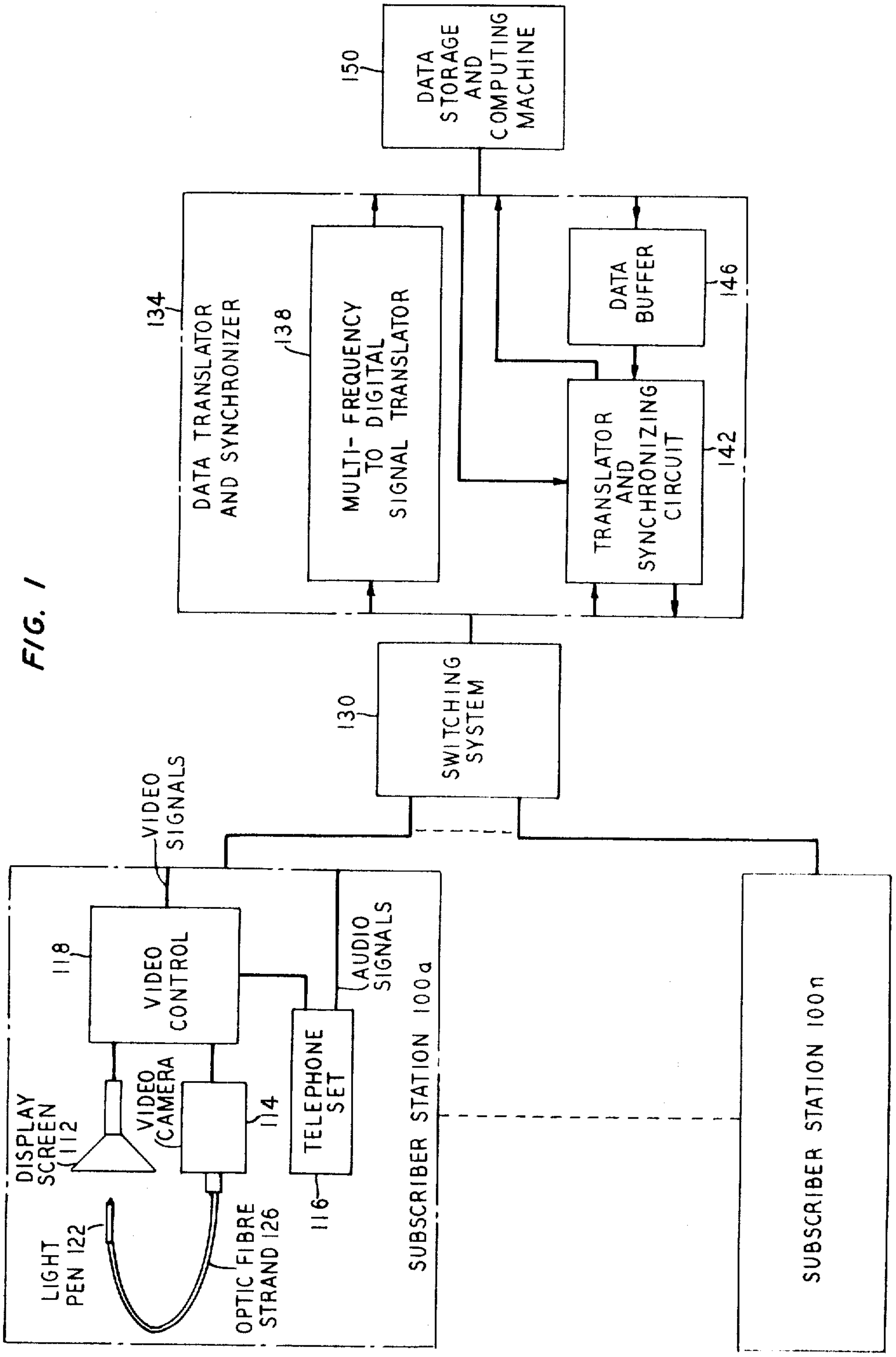
FIG. 1 shows an illustrative embodiment of a visual communication and computer graphic system made in accordance with the principles of the present invention.

Referring now to FIG. 1, there is shown a number of subscriber stations 100 *a*–100 *n*, each connected to a switching system 130 which, in turn, is connected via a data translator and synchronizer 134 to data storage and computing machine 150. Each subscriber station comprises a video-telephone set which includes a video camera 114, a cathode ray tube display screen 112, video control circuitry 118, a standard telephone set 116 capable of generating multifrequency signals, a light pen 122 and a fiber optic strand 126 connecting the light pen 122 to the video camera 114. The fiber optic strand 126 may be attached or coupled to the lens mounting of the video camera 114 by means of a grommet or other fitting. Video-telephone sets such as that described are in use and have been extensively described in the literature; for an introductory explanation of the basic set see *Bell Laboratories Record*, Vol. 42, no. 4, Apr. 1964, pp. 114–120. Light pens and fiber optic strands are likewise well known in the art. See, for example, "-Visual Information Display Systems," NASA SP-5049, 1968, pp. 26–27. The multifrequency telephone signaling set might advantageously comprise the station set described in *I.E.E.E. Transactions on Communications and Electronics*, Mar. 1963, pp 9–17.

Each subscriber may initiate a connection with any other subscriber station served by the switching system 130 by simply "dialing" or keying an appropriate code on the telephone set 116. This keying causes the generation of switching signals which are transmitted to the switching system 130 and there processed. The switching system 130 may comprise a system of the type disclosed in H. J. Michael et al. U.S. Pat. No. 3,335,226, issued Aug. 8, 1967, or a time division telephone system such as disclosed in D. B. James U.S. Pat. No. 3,226,484, issued Dec. 28, 1965, each of which provides for switching video-telephone channels as well as audio channels. The switching system 130, after processing the switching signals, establishes a video connection between the initiating subscriber station and the station specified by the "dialed" code. After the connection is established, the two subscribers may communicate with each other visually as well as orally as described in the aforecited *Bell Laboratories Record* reference.

Each subscriber may also establish a connection between his station and the data storage and computing machine 150 for computer graphics services. Such a connection is likewise established by keying an appropriate code on the telephone set 116. The switching signals generated thereby are processed by the switching system 130 which establishes a connection between the initiating station and the data storage and computing machine via the data translator and synchronizer 134. The data storage and computing machine might illustratively comprise any general purpose computer, for example, the IBM 360–40 computer. A translator 138 detects the origination of the call, for example, by detecting ringing current applied by the switching system 130 and then signals the data storage and computing machine 150 that a connection is established. In response to this signal, the computing machine 150 generates a set of instructions to guide the subscriber in the use of the computer graphics service. These instructions, in the form of digital output signals, are applied to a data buffer 146, and then to a translator and synchronizing circuit 142 where the digital signals are converted to video signals. From there, the video signals are transmitted via the switching system 130 to the initiating subscriber station where the instructions are displayed on the display screen 112. In addition to describing how to use the computer graphics service, the instructions would also indicate how to synchronize the system for the computer graphics operation.

Synchronization is not necessary in typical computer graphics systems since in those systems the computer is located in close proximity to the display apparatus. Thus, when the computer transmits display screen scanning information to the display apparatus and the user points to a particular part of the display with his light pen, a signal is transmitted back to the computer almost simultaneously with the generation by the computer of that part of the scanning signal detected. In this manner, when the computer receives a signal from the display apparatus, it "knows" that that part of the scanning signal (i.e. that part of the display) just previously transmitted to the display apparatus is the part just detected by the light pen and with respect to which the user desires to take action.

In the present invention, on the other hand, the computer (data storage and computing machine) may be located at some distance from the display apparatus (video-telephone station). Thus, since the round trip distance from computer to video-telephone set to computer may be great, the portion of the display detected by the light pen and of which the computer is signaled would not be the same portion of the display just transmitted by the computer (because of the time elapsed in transmitting the video signal to the station and getting a response back). Also, the time delay would vary from call to call depending on the location of the originating station. The manner of overcoming this problem in the present invention will now be discussed.

In the video-telephone set, two different scanning operations are performed. The display screen of the subscriber station which is simply a cathode-ray tube is, of course, scanned in the generation of the display picture. Likewise, the camera tube of the video camera upon which the light passing through the camera lens impinges is scanned. See generally Millman, J. and Taub, H., *Pulse and Digital circuits*, McGraw-Hill, 1956, pp. 532–535. Normally, the scanning phase of the display screen is not in synchronization with the scanning phase of the camera tube. (In the normal use of the video-telephone station, these scanning phases need not be in synchronization.) If these scanning phases were in synchronization, then detection of a light impulse at a particular position on the display screen (i.e. having a particular raster line number and sweep position) by the light pen would cause illumination of the camera tube at a time when the position on the tube being scanned corresponded to the position of the light impulse on the screen. A video signal identifying this position would then be transmitted by the camera to the data storage and computing machine for processing. Since the position identified by this signal corresponds to the position on the screen being pointed to by the light pen, the data storage and computing machine "knows" which part of the display the user is designating. Appropriate action with respect to the part designated could then be taken.

Figure 2:
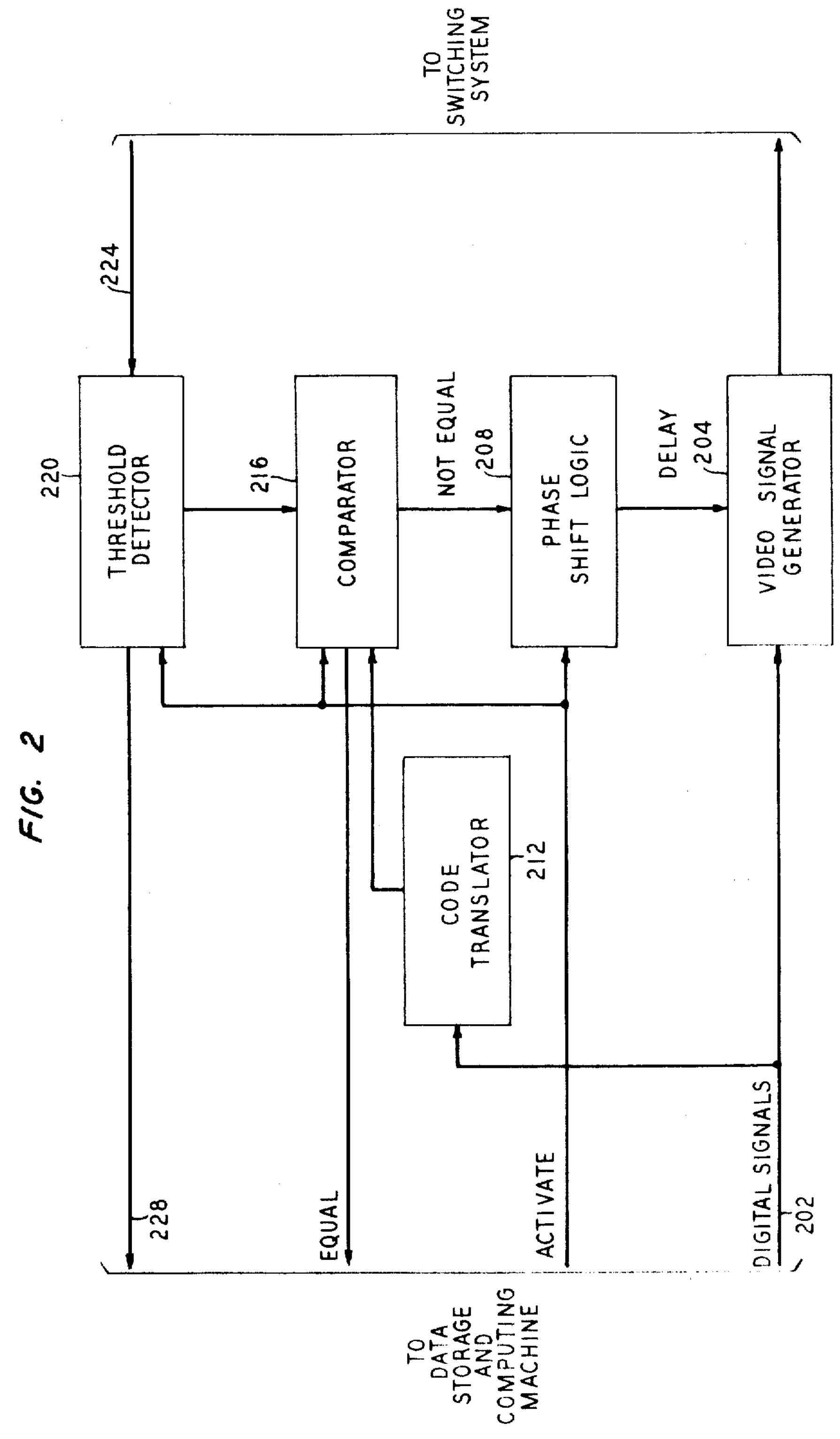
FIG. 2 shows the detailed structure of the translator and synchronizing circuit of FIG. 1.

In order to synchronize the scanning phase of the display screen (i.e. the scanning phase of video signal transmitted to the video-telephone station) with the scanning phase of the camera tube (i.e. the scanning phase of any video signal transmitted by the camera), the user, after establishing a connection from his video-telephone station to the data storage and computing machine, signals the machine via the telephone set 116 that he wishes to use the light pen facility. The data storage and computing machine 150 then signals the translator and synchronizing circuit 142, shown in detail in FIG. 2, that synchronization is to be established. In particular, the data storage and computing machine 150 activates a threshold detector 220, a comparator 216, and phase shift logic 208, all of FIG. 2. The data storage and computing machine 150 then signals a video signal generator 204 to generate a signal representing a dot or spot of light (or other mark) at a prespecified position in the raster. The video signal generator 204 generates a signal containing the appropriate scan information for transmission via the switching system 130 to the subscriber station. The video signal generator 204 might illustratively comprise the video generator described in Datanet–750 Data Display System, Vol 2, Dec. 1965, G. E. Co., pp. 2–69 through 2–72 or J. L. Botjer et al. Pat. No. 3,413,610 issued Nov. 26, 1968. The data storage and computing machine 150 also instructs the user, either before or during the generation of the light spot, to place his light pen on the spot of light on the display screen. Upon placement of the light pen on the spot of light, light impulses would be detected by the light pen and video camera and transmitted via the switching system 130 to the threshold detector 220. The threshold detector 220 records the line number and sweep position in the raster of the received signal of the detected light impulses. The threshold detector 220 might illustratively comprise a counter system as described, for example, in the aforecited Millman & Taub text, p. 509. The counter system there shown includes a counter which registers a count proportional to the time between the beginning of the raster sweep and the receipt of the light pen pulse. The count registered on the counter, therefore, would correspond to a particular position in the raster of the video signal received from the station. The threshold detector 220 after recording the position of the light impulse would apply this information to the comparator 216. While this is taking place, the digital signal (for generating the spot of light) applied by the data storage and computing machine 150 to the video signal generator 204 would also be applied to a code translator 212 where the signal would be translated into a count representing the position on the display screen 112 of the spot of light. Code translator 212, which transforms one set of binary signals into a different set of binary signals can be implemented in a variety of ways well known to designers of logic circuits. In particular, the design methods and illustrative circuits included in *Logic Design of Digital Computers* by M. Phister Jr., John Wiley and Sons, 1958 at pp. 178, 193, are useful for this purpose. The count developed by code translator 212 is applied to the comparator 216 where it is compared with the count applied by the threshold detector 220. If the counts are unequal, as would usually be the case when initiating synchronization of the system, the comparator 216 applies a signal to a phase shift logic circuit 208. In response to this signal, the phase shift logic circuit 208 applies a signal to the video signal generator 204 indicating to the generator that the video signal being transmitted to the video-telephone station is to be delayed. In response to this signal, the video signal generator 204 delays the outgoing video signal by a certain predetermined amount, This process is repeated until the count applied by the threshold detector 220 and the translator 212 to the comparator 216 are found to be equal, at which time the comparator signals the data storage and computing machine 150 that the system is in synchronization. Illustratively, if the video signal generator 204 is of the type described in the above cited Botjer et al. patent (with a shift register substituted for the recirculating delay line buffer 21), the phase shift logic circuit 208 can be simply an AND gate which inhibits the clock pulses from clock 23 for an appropriate interval when the comparator 216 signifies "no match." The data storage and computing machine 150 then removes the dot of light and notifies the user that the graphics mode may now be utilized.

An alternative synchronization arrangement to that described above would be to include a comparator 216 which determines the difference between the count applied by the threshold detector 220 and the count applied by the translator 212 and signals the phase shift logic 208 as to the magnitude of this difference. The phase shift logic 208 would then signal the video signal generator 204 to delay the outgoing video signal an amount in proportion to the magnitude of the difference between the two counts. In this manner, the scanning phase of the video signal transmitted to the video-telephone station and the scanning phase of the video signal received from the video-telephone station would be synchronized in one step rather than in a series of steps. This, however, would require more complicated logic in the translator and synchronizing circuit shown in FIG. 2.

After obtaining synchronization, the system may be utilized in a typical computer graphics mode where the light pen and camera plus telephone set would be utilized as the input apparatus to the data storage and computing machine and the display screen would be the output. A list of available programs might first be delivered to the subscriber station 100 by the data storage and computing machine 150 for visual presentation on the display screen 112. The user then points the light pen 122 at the graphics program in the displayed listing which he desires to implement and signals the data storage and computing machine to this effect by means of the telephone set 116. The signals generated on the telephone set are transmitted via the switching system 130 to a multifrequency traditional signal translator 138 where they are translated into digital input signals acceptable by the data storage and computing machine 150. The translator 138 might advantageously comprise a multifrequency receiver and translator as described in the aforecited *I.E.E.E. Transactions on Communications and Electronics*, pages 9–17. See also *I.E.E.E. Transactions on Communications Technology*, Dec. 1967, pages 812–824. The position on the display screen to which the light pen is pointing (identifying a particular graphics program) is indicated in the video signal received from the station by the threshold detector 220. The threshold detector registers this position and then signals the data storage and computing machine via lead 228 identifying this position. Likewise, the digital input signals obtained in the translation by the signal translator 138 are applied to the data storage and computing machine. The data storage and computing machine 150 processes these signals to determine which graphics program the user desires to implement. In effect, the data storage and computing machine identifies which data on the display screen (i.e. which graphics program indication) is spatially coincident with the light pen when the telephone signals are received. The designated program routine is then implemented by the data storage and computing machine. As succeeding graphic displays of the routine are generated, the user points with the light pen to a desired location on the display and then signals the data storage and computing machine to read the location and take the next appropriate step or action in the programmed procedure. Operation thus proceeds in a typical computer graphics mode.

Various graphical programming languages have been designed for computer graphics problem-solving processes. A typical one, GRIN-2 (GRaphical INteraction), is briefly described in Section V, of the article "Multi-Function Graphics for Large Computer Systems" by C. Christensen et al., *American Federation of Information Processing Societies (AFIPS) Conference Proceedings*, 1967 Fall Joint Computer Conference, Vol. 31. Computer graphics programs are used for a variety of functions, such as information retrieval, inventory control, circuit design and analysis, etc. In the June 1968 issue of the *Bell Laboratories Record*, two articles by W. H. Ninke and P. S. Kopel, respectively, include brief descriptions of how computer graphics is utilized in data analysis (page 85) and circuit design (pages 194–5).

In the above-described manner, any subscriber of a video-telephone station may utilize the video display apparatus either for visually communicating with another subscriber or for computer graphics operations in conjunction with a data storage and computing machine with only the additional requirements of a light pen and fiber optic strand connecting the light pen to the video camera of the subscriber station set.

It is to be understood that the above described arrangement is only illustrative of the application of the principles in the present invention. Numerous other arrangements may be devised by those skilled in the art without departing from the spirit and scope of the invention. For example, a synchronizing circuit for synchronizing the scanning phase of video signals transmitted to the station with the scanning phase of video signals received from the station could be located adjacent to and integrated with the station equipment rather than located adjacent to the data storage and computing machine as shown in FIG. 1. This would require some modification of the video-telephone station. Furthermore, plurality of data translators and synchronizers 134 might be provided to enable simultaneous access by the subscribers to the data storage and computing machine 150 which would process the multiple calls on a time shared basis.

What is claimed is:

1. In combination in a visual communication system,

A video station comprising video display apparatus for receiving video signals and generating video displays in response thereto, a video camera, apparatus for transmitting video signal representations of the images photographed by said camera, and a light pen and a fiber optic strand connecting the light pen to said camera, whereby said light pen detects light signals displayed on said display apparatus when the pen is positioned over light signals on said apparatus and transmits signals to said camera in response to said light signals, A data storage and computing machine for processing digital input signals and for generating digital output signals in response thereto, translation means interconnecting said video station and said data storage and computing machine for translating video signals received from said station into digital input signals for application to said machine and for translating digital output signals received from said machine into video signals for application to said station, and synchronization means connected to said translation means for synchronizing the scanning phase of video signals applied to said station with the scanning phase of video signals received therefrom.

2. A system as in claim 1 wherein said station further includes means for generating and applying multifrequency signals to said translation means, and wherein said translation means further includes means for translating multifrequency signals received from said station into digital input signals for application to said data storage and computing machine whereby said data storage and computing machine processes the digital input signals obtained from said multifrequency signals and generates digital output signals in response thereto.

3. A system as in claim 2 wherein said synchronization means comprises a threshold detector for detecting the scanning phase of video signals received from said station and for generating a numerical representation of the scanning phase thereof, a code translator for translating digital output signals generated by said data storage and computing means into a numerical representation of the scanning phase thereof, a comparator for comparing the numerical representations generated by said threshold detector and said code translator, for applying a first signal to said data storage and computing machine when said numerical representations are equal, and for generating a second signal when said numerical representations are unequal, and a phase shift logic circuit responsive to said second signal for signaling said translation means to delay the video signals transmitted to said station.

4. A system as in claim 3 further comprising a plurality of video-telephone stations and a switching network interconnecting said stations and said translation means and responsive to multifrequency signals generated by said stations for establishing a communication channel between the station generating the signals and any other station or said translation means.

5. In a visual communication system including a video station comprising video display apparatus for receiving video signals and generating video displays in response thereto, a video camera, apparatus for transmitting video signal representations of the images photographed by said camera, and a light pen and a fiber optic strand connecting the light pen to said camera, whereby said light pen detects light signals displayed on said display apparatus when the pen is positioned over light signals on said apparatus and transmits signals to said camera in response to said light signals, a method of synchronizing the phase of video signals transmitted to said station with the phase of video signals received from said station comprising the steps of generating a dot of light at a prespecified position on the display screen of said station by said data storage and computing machine, placing said light pen over said dot on said display screen to thereby transmit a video signal representation of the light impulse detected by said light pen, comparing the position of the dot in the raster generated by said station as indicated in said video signal representation with the position of the dot in the raster being transmitted to said station, and delaying the video signal transmitted to said station until said comparison indicates that the positions are equal.

6. An improved visual communication system comprising a plurality of video-telephone stations each of which includes video display apparatus, a video camera for generating video signals, and means for generating switching signals, a data storage and computing machine for processing input signals and for generating output signals in response thereto, translation means connected to said data storage and computing machine for translating switching signals and video signals into input signals to be applied to said data storage and computing machine and for translating output signals from said data storage and computing machine into video signals, and a switching system capable of interconnecting each of said stations to any other station or to said translation means in response to switching signals generated at said stations for transmitting switching signals and video signals therebetween wherein the improvement comprises synchronization means connected to said translation means for synchronizing video signals transmitted to any of said stations with the scanning phase of video signals received therefrom, and wherein at least one of said stations further includes a light pen and a fiber optic strand interconnecting said light pen to the camera of said station.

7. A computer graphics system comprising a video-telephone set including a video camera, a display screen and a telephone set for transmitting and receiving video signals, a light pen assembly including a fiber optic strand connecting the light pen to the camera of said video-telephone set for detecting light signals displayed on the viewing screen of said video-telephone set and for transmitting said light signals to the camera of said set a data storage and computing machine for processing input video signals and for generating video output signals response thereto, a synchronization circuit interconnecting said video-telephone set with said data storage and computing machine for synchronizing the scanning phase of video signals received from said telephone set with the scanning phase of video signals transmitted to said telephone.

8. An improved computer graphics system comprising a plurality of graphic display stations, each including video display apparatus, a light pen for signaling said display apparatus when said light pen is placed over objects displayed on said display apparatus, means for generating video signals for display on said display apparatus in response to signals from said light pen, and means for generating inquiry signals, a computer for processing digital input signals and for generating digital output signals in response thereto, translation means connected to said computer for translating inquiry signals and video signals generated at said display stations into digital input signals for application to said computer and for translating digital output signals into video signals, and means interconnecting each of said stations to said translation means for transmitting inquiry signals and video signals generated by said stations to said translation means and for transmitting video signals from said translation means to said stations for display on said display apparatus wherein said improvement comprises a telephone set and a video camera for generating audio signals and video signals, respectively, and wherein said interconnecting means further includes means responsive to said inquiry signals for interconnecting any of said stations to any other station for the transmission of video and audio signals therebetween.

9. A computer graphics system as in claim 8 wherein said interconnecting means further includes means responsive to said inquiry signals for selectively interconnecting any of said stations to said translation means for the transmission of video and inquiry signals therebetween.

10. A system as in claim 9 further including synchronizing means connected to said translation means for synchronizing the phase of video signals transmitted to said stations with the phase of video signals received therefrom.

11. In a computer graphics display system including video display apparatus for receiving video signals and generating video displays in response thereto, a video camera, apparatus for transmitting video signal representations of the images photographed by said camera, a light pen and a fiber optic strand connecting the light pen to said camera for detecting light signals displayed on said display apparatus when the pen is positioned over light signals on said apparatus and transmitting signals to said camera in response to said light signals, and a computer for processing video signals received from said video transmitting apparatus and for generating video signals for transmission to said video display apparatus, a method of synchronizing the phase of video signals transmitted to said video display apparatus with the phase of video signals received from said video signal transmitting apparatus comprising the steps of generating a spot of light at a prespecified position on the display screen of said video display apparatus by said computer, placing said light pen over said spot on said display screen to thereby transmit a video signal representation of the light impulse detected by said light pen, comparing the position of the spot in the raster generated by said station as indicated in said video signal representation with the position of the spot in the raster being transmitted to said station, and delaying the video signal transmitted to said station until said comparison indicates that the positions are equal.

* * * * *

UNITED STATES PATENT OFFICE
CERTIFICATE OF CORRECTION

Patent No. 3,618,035 Dated November 2, 1971

Inventor(s) Robert L. Simms, Jr.

It is certified that error appears in the above-identified patent and that said Letters Patent are hereby corrected as shown below:

Column 3, line 64, "round trip" should read --round-trip--. Column 4, line 5, "circuits" should read --Circuits--. Column 6, line 47, between the words "Furthermore," and "plurality", --a-- should be inserted; and line 51, "time shared" should read --time-shared--. Column 8, line 22, after the word "telephone" and before the period, --set-- should be inserted.

Signed and sealed this 16th day of May 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334